United States Patent
Zhang et al.

(10) Patent No.: US 9,584,371 B2
(45) Date of Patent: *Feb. 28, 2017

(54) SYSTEM AND METHOD FOR ASSIGNING MULTI-INSTANCE SERVICES IN A PROVIDER NETWORK

(71) Applicant: TELEFONAKTIEBOLAGET L M ERICSSON (PUBL), Stockholm (SE)

(72) Inventors: Ying Zhang, Fremont, CA (US); Neda Beheshti-Zavareh, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

This patent is subject to a terminal disclaimer.

(21) Appl. No.: 14/336,990

(22) Filed: Jul. 21, 2014

(65) Prior Publication Data

US 2015/0081855 A1   Mar. 19, 2015

Related U.S. Application Data

(63) Continuation-in-part of application No. 14/026,344, filed on Sep. 13, 2013, now Pat. No. 8,817,625.

(51) Int. Cl.
| | |
|---|---|
| *H04L 12/26* | (2006.01) |
| *H04L 12/24* | (2006.01) |
| *H04Q 3/00* | (2006.01) |
| *H04L 29/06* | (2006.01) |

(52) U.S. Cl.
CPC .......... *H04L 41/12* (2013.01); *H04L 41/5045* (2013.01); *H04L 41/5054* (2013.01); *H04Q 3/0029* (2013.01); *H04L 63/00* (2013.01)

(58) Field of Classification Search
CPC .................................................. H04L 41/0803

USPC ......................................................... 709/220
See application file for complete search history.

(56) References Cited

U.S. PATENT DOCUMENTS

| | | | |
|---|---|---|---|
| 7,298,725 B2 | 11/2007 | Rune | |
| 7,733,913 B1 | 6/2010 | Cheung et al. | |
| 7,860,100 B2 | 12/2010 | Khalid et al. | |
| 8,170,038 B2 | 5/2012 | Belanger et al. | |
| 8,284,664 B1 | 10/2012 | Aybay et al. | |

(Continued)

FOREIGN PATENT DOCUMENTS

| | | |
|---|---|---|
| EP | 1387553 A1 | 2/2004 |
| EP | 2226970 A1 | 9/2010 |
| WO | WO 2012/047885 A1 | 4/2012 |

OTHER PUBLICATIONS

P. Quinn, et al., "Network Service Header; draft-quinn-nsh-00.txt"; Network Working Group; Jun. 13, 2013; 20 pages.

(Continued)

*Primary Examiner* — David Lazaro
*Assistant Examiner* — Zia Khurshid

(57) ABSTRACT

A system and method for placing inline services having multiple instances in a service provider network. In one implementation, a topology of the service provider network and services to be placed therein are defined, wherein a network node may include a data forwarding functionality and a control plane functionality. Using service chaining policy requirements, the number of service instances, etc. as input, services and their multiple instances are placed within the network such that an overall network metric is optimized for all subscriber data flows.

20 Claims, 6 Drawing Sheets

(56) References Cited

U.S. PATENT DOCUMENTS

| | | | |
|---|---|---|---|
| 8,339,959 | B1 | 12/2012 | Moisand et al. |
| 8,583,781 | B2 | 11/2013 | Raleigh |
| 8,817,625 | B1 | 8/2014 | Zhang et al. |
| 2006/0084432 | A1 | 4/2006 | Balasubramanian et al. |
| 2008/0155087 | A1* | 6/2008 | Blouin .............. H04L 43/0817 709/223 |
| 2008/0177896 | A1 | 7/2008 | Quinn et al. |
| 2009/0003364 | A1 | 1/2009 | Fendick et al. |
| 2009/0037713 | A1 | 2/2009 | Khalid et al. |
| 2009/0164583 | A1 | 6/2009 | Zhu |
| 2009/0259810 | A1 | 10/2009 | Baden et al. |
| 2010/0148940 | A1 | 6/2010 | Gelvin et al. |
| 2010/0165985 | A1 | 7/2010 | Sharma et al. |
| 2010/0226369 | A9 | 9/2010 | Havemann et al. |
| 2010/0303083 | A1 | 12/2010 | Belanger et al. |
| 2011/0055845 | A1 | 3/2011 | Nandagopal et al. |
| 2011/0295942 | A1* | 12/2011 | Raghunath ............. H04L 45/00 709/203 |
| 2011/0299419 | A1 | 12/2011 | Fendick et al. |
| 2012/0002672 | A1 | 1/2012 | Alexander, Jr. et al. |
| 2012/0026897 | A1 | 2/2012 | Guichard et al. |
| 2012/0027016 | A1 | 2/2012 | Filsfils et al. |
| 2012/0163180 | A1 | 6/2012 | Goel |
| 2012/0207174 | A1 | 8/2012 | Shieh |
| 2012/0281540 | A1 | 11/2012 | Khan et al. |
| 2012/0314573 | A1 | 12/2012 | Edwards et al. |
| 2013/0003735 | A1 | 1/2013 | Chao et al. |
| 2013/0163594 | A1 | 6/2013 | Sharma et al. |
| 2013/0272305 | A1 | 10/2013 | Lefebvre et al. |
| 2013/0290955 | A1 | 10/2013 | Turner et al. |
| 2014/0043977 | A1 | 2/2014 | Wiley et al. |
| 2014/0105216 | A1 | 4/2014 | McDysan |
| 2014/0149493 | A1 | 5/2014 | Acer et al. |
| 2014/0215074 | A1 | 7/2014 | Zhang et al. |
| 2014/0241356 | A1 | 8/2014 | Zhang et al. |
| 2014/0254374 | A1 | 9/2014 | Janakiraman et al. |
| 2014/0269299 | A1 | 9/2014 | Koornstra |
| 2014/0334295 | A1 | 11/2014 | Guichard et al. |
| 2014/0334488 | A1 | 11/2014 | Guichard et al. |
| 2014/0355436 | A1 | 12/2014 | Zhang et al. |
| 2015/0003455 | A1 | 1/2015 | Haddad et al. |
| 2015/0081855 | A1 | 3/2015 | Zhang et al. |
| 2015/0106526 | A1 | 4/2015 | Arndt et al. |

OTHER PUBLICATIONS

D. Farinacci et al. "LISP Traffic Engineering Use-Cases; draft-farinacci-lisp-te-02"; Internet Engineering Task Force; Jan. 7, 2013; 24 pages.
Rizzo L. et al.: "CHANGE: Enabling Innovation in the Internet Architecture through Flexible Flow-Processing Extensions", D3.2: Flow Processing Platform Design and Early Implementation, ICT-257422, submission date Sep. 28, 2012, p. 4, p. 15, pp. 19-20, pp. 41-47, pp. 50-53, figures 3.1, 3.2.
Qazi Z. A. et al.: "SIMPLE-fying Middlebox Policy Enforcement Using SDN", SIGCOMM, ACM; Aug. 12-16, 2013, Hong Kong, China; the whole document.
Gibb G. et al.: "Outsourcing network functionality", Hot Topics in Software Defined Networks, ACM, Aug. 13, 2012, Helsinki, Finland; the whole document.
Farinacci et al. "Locator/ID Separation Protocol (LISP)", Internet Engineering Task Force (IETF) RFC 6830, Jan. 2013, the whole document.
Zhang Y. et al.: "STEERING: A software-defined networking for inline service chaining", 2013 21st IEEE International Conference on Network Protocols (ICNP), IEEE, Oct. 7, 2013 (Oct. 7, 2013), pp. 1-10.
Openflow 1.1 in Hardware: "I was wrong (again)"; Apr. 29, 2011; 3 pages.
A 100 Gig Openflow 1.1 Switch; Powerpoint slide downloaded from the Internet on Apr. 16, 2013; 1 page.

L. Erran Li et al., "Mosaic: Policy Homomorphic Network Extension", Lux Et Veritas, Yale University Department of Computer Science, May 13, 2010, 15 pages.
Joseph, D.A. et al., "A Policy-aware Switching Layer for Data Centers," in Proc. ACM SIGCOMM, Aug. 2008, pp. 51-62.
McKeown, et al. "OpenFlow: Enabling Innovation in Campus Networks", SIGCOMM, Mar. 14, 2008, the whole document.
OpenFlow Switch Specification, Version 1.1.0 Implemented (Wire Protocol 0x02), Feb. 28, 2011, the whole document.
Guo et al: Composition Oriented Web Service Semantic Relations Research. Service Sciences (IJCSS), 2011 International Joint Conference on, IEEE, May 25, 2011 (May 25, 2011).
Lee et al. A context-aware service composition scheme for service overlay network. ICT Convergence (ICTC), 2011 International Conference on, IEEE, Sep. 28, 2011 (Sep. 28, 2011).
J. Postel, "User Datagram Protocol," Aug. 28, 1980, 3 pages, RFC: 768.
"Transmission Control Protocol, DARPA Internet Program Protocol Specification", Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.

(56) References Cited

OTHER PUBLICATIONS

D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LOP Specification," Oct. 2007, 135 pages, Network Working Group, Request for Comments: 5036, The IETF Trust.
R. Coltun, et al., "OSPF for 1Pv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

SYSTEM AND METHOD FOR ASSIGNING MULTI-INSTANCE SERVICES IN A PROVIDER NETWORK

CROSS-REFERENCE TO RELATED APPLICATIONS

This application is a Continuation-In-Part application of the following co-pending commonly assigned patent application: (i) "SERVICE PLACEMENT FOR INLINE SERVICES CHAINING WITH MULTIPLE INSTANCES", application Ser. No. 14/026,344, filed Sep. 13, 2013, in the name(s) of Ying Zhang and Neda Beheshti-Zavareh, and discloses subject matter that is related to the subject matter of the following U.S. patent application(s): (i) "METHOD AND APPARATUS FOR PLACING SERVICES IN A NETWORK", application Ser. No. 13/751,826, filed Jan. 28, 2013, in the name(s) of Ying Zhang and Neda Beheshti-Zavareh; and (ii) "CHAINING OF INLINE SERVICES USING SOFTWARE DEFINED NETWORKING", application Ser. No. 13/556,456, filed Jul. 24, 2012, in the name(s) of Geoffrey Lefebvre, Erik Rubow and Ravi Manghirmalani; each of which is hereby incorporated by reference in its entirety.

FIELD OF THE DISCLOSURE

The present disclosure generally relates to the field of networks. More particularly, and not by way of any limitation, the present disclosure is directed to placement of services having multiple instances in a network.

BACKGROUND

Operators use different middlebox services or appliances, called inline services, such as Deep Packet Inspection (DPI), logging/metering/charging/advanced charging, Firewall, Intrusion Detection and Prevention (IDP), Network Address Translation (NAT), etc., to manage subscribers' traffic. These services have high requirements on throughput and packet inspection capabilities. They can be transparent or nontransparent to the end users. Inline services can be hosted on dedicated physical hardware or in virtual machines.

Service chaining may be required if the traffic needs to go through more than one inline service. Moreover, if more than one chain of services is possible, the operator needs to configure the networking infrastructure to direct the right traffic through the right inline service path.

SUMMARY

The present patent disclosure is broadly directed to a scheme for placing inline services having multiple instances (also referred to as "service replicas") in a service provider network.

In one aspect, an embodiment of a method for assigning services or service instances in a service provider network is disclosed. The claimed embodiment comprises, inter alia, defining a topology of the service provider network wherein a network node may include both data forwarding plane and control plane functionalities. A set of services to be placed or assigned within the service provider network is then defined or otherwise obtained, wherein at least one service may be provided with multiple instances (i.e., replicas). A set of service requirements is obtained or otherwise determined for a plurality of subscriber data flows entering the service provider network at one or more ingress nodes, each requirement being a sequence of services to be traversed for each subscriber data flow prior to exiting from one or more egress nodes. Thereafter, the services and their multiple instances, if any, may be assigned relative to one or more network nodes of the service provider network such that an overall network metric associated with the service provider network is optimized for all subscriber data flows. In an example implementation, the network metric to be optimized comprises at least one of a performance-based metric such as bandwidth metric (bandwidth utilization, for instance), total delay and/or distance, hop count, etc. for the subscriber flows. In a further implementation, the foregoing service assignment/placement methodology may further comprise defining service dependencies for each service and ranking the service dependencies; determining a weight for each service based on rankings of the service dependencies, the number of instances of each service, or both; and iteratively placing or assigning each service and its instance (s) relative to the network nodes based on a local optimization mechanism (e.g., using a greedy algorithm) for locally optimizing the select network/performance metric, starting with the service having a largest weight value.

In another aspect, an embodiment of a network management node is disclosed that comprises one or more processors and a persistent memory module having instructions configured to perform an embodiment of a method described hereinabove when executed by the processors. In a still further aspect, an embodiment of a non-transitory computer-readable medium containing instructions stored thereon is disclosed for performing one or more embodiments of the methods set forth above. It will be realized that although certain alternative/additional embodiments may relate to service placement within a Software-Defined Network (SDN) architecture, the present invention is not necessarily limited thereto and the teachings hereof may be practiced in any network including, e.g., one that involves traffic steering and varying degrees of control and data plane coupling.

Advantages of the present invention include, but not limited to, optimizing placement and/or assignment of multi-instances services within a service provider network having one or more service chaining policies. Because default assignments can be changed dynamically, service network operators can bring more services online without impacting scalability. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1A:
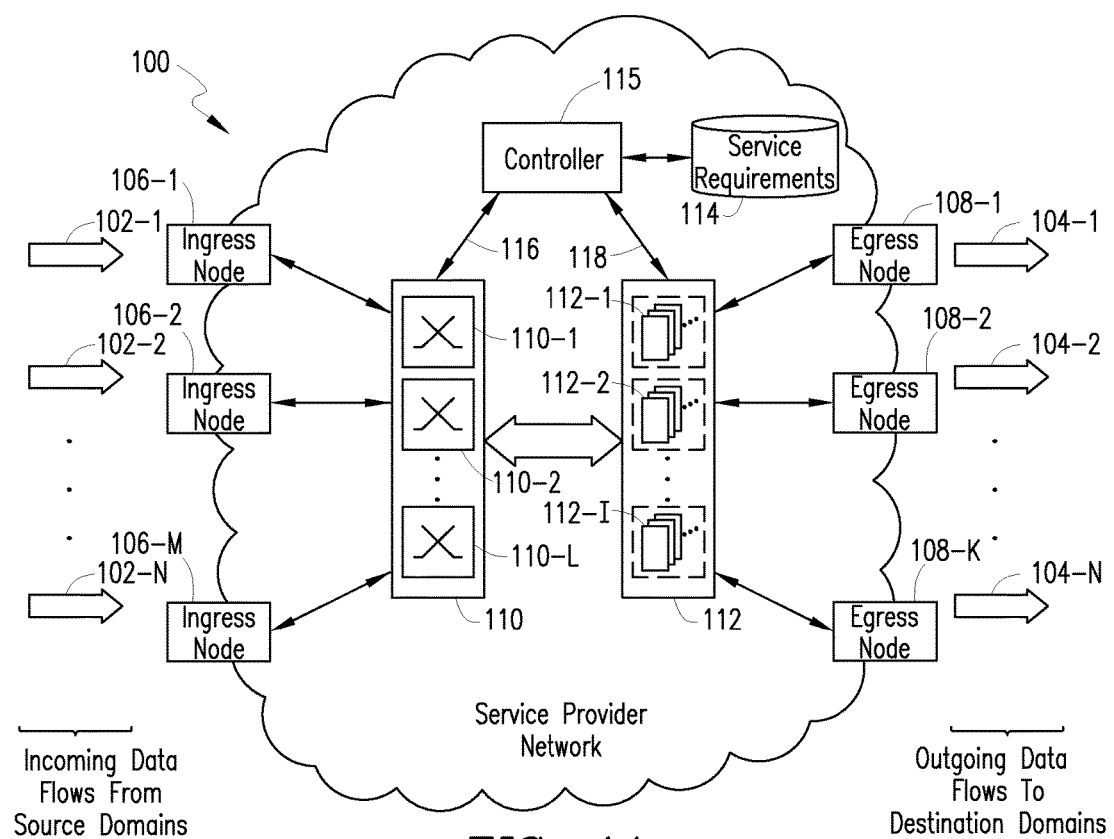
FIG. 1A depicts an example network wherein one or more embodiments of the present patent disclosure may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that one or more embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) may access or consume content/services provided over a packet-switched wide area public network such as the Internet via suitable service provider access networks. Subscriber end stations may also access or consume content/services provided on virtual private networks (VPNs) overlaid on (e.g., tunneled through) the Internet. Regardless of the specific implementation, it should be appreciated that one or more embodiments of the present patent disclosure may involve a service provider network having a plurality of network nodes (e.g., switches interconnected in a topological arrangement) wherein one or more services having multiple instances (i.e., "service replicas") may be placed for traversal by a plurality of subscriber data flows (generated by or involving any type of above-described subscriber end stations) according to known or otherwise preconfigured service requirements.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices (e.g., an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device may be configured to store code and/or data for execution on one or more processors of that electronic device for purposes of implementing one or more techniques of the present disclosure.

Taking particular reference to FIG. 1A, depicted therein is an example service provider network 100 having one or more ingress nodes 106-1 to 106-M and one or more egress nodes 108-1 to 108-K, wherein one or more embodiments of the present patent disclosure may be practiced for purposes of placing multi-instance services within the network. Reference numerals 110-1 to 110-L refer to a plurality of data forwarding nodes coupled together in a topological configuration for effectuating routing of incoming data packet flows 102-1 to 102-N received from source domains at the ingress nodes 106-1 to 106-M to the egress nodes 108-1 to 108-K that emit outgoing data packet flows 104-1 to 104-N to external domains. It should be appreciated that the routing of data packets within the network 100 may be effectuated using any known class of routing protocols between any two nodes in the network, such as, e.g., a link-state routing protocol or a distance-vector routing protocol. Reference numerals 112-1 to 112-I refer to one or more inline services that are to be placed within the network 100 which the incoming subscriber data flows 102-1 to 102-N may be required to traverse in a sequential order based on subscriber and/or operator policies, service chaining requirements, and the like. By way of example, such services may comprise Deep Packet Inspection (DPI), Virus Scanning (VS), Intrusion Detection and Prevention (IDP), Firewall (FW) filtering, Network Address Translation (NAT), and the like. Further, one or more of such inline services may be provided in multiple instances or replicas, which may be deployed by the network operator for load-balancing, for example.

By way of illustration, the example service provider network 100 may be architected as a Software-Defined Network (SDN) based on known protocols such as, e.g., OpenFlow (OF) protocol, Forwarding and Control Element Separation (ForCES) protocol, etc., in one embodiment. It should be appreciated, however, that alternative/additional embodiments described herein may be practiced in conjunction with other network architectures also, as will be set forth below. An example SDN architecture typically involves separation and decoupling of the control and data planes of the network elements, whereby network intelligence and state control may be logically centralized and the underlying network infrastructure is abstracted from the applications. One implementation of an SDN-based service network may therefore comprise a network-wide control platform, executing on or more servers in the network, which is configured to oversee and control a plurality of data forwarding nodes or switches. Accordingly, a standardized interfacing may be provided between the network-wide control platform (which may be referred to as a "central controller" for purposes of some embodiments of the present patent application) and the data switching/forwarding nodes, thereby facilitating high scalability, flow-based services chaining, multi-tenancy and secure infrastructure sharing, virtual overlay networking, efficient load balancing, and the like. In contrast, traditional network architectures follow an integrated design where the control plane and data-forwarding plane are tightly coupled in the same network element, which usually results in overly complicated control plane and complex network management, with concomitant shortcomings and deficiencies.

A typical SDN switching node comprises a flow table, which performs packet lookup and forwarding, and a secure channel that connects the switch to the central controller, allowing commands and packets to be sent therebetween using an open and standard protocol. The main task of a forwarding element, or a switch, is to forward packets from an ingress port to an egress port, according to the rules in the flow table programmed by the controller. The flow table may contain a set of flow entries, activity counters, and a set of one or more actions to apply to matching packets. For instance, a flow entry may be configured with a set of actions such as: forwarding packets to a given port, modifying certain bits in the packet header, encapsulating packets to the controller, or simply dropping the packets. For the first packet in a new flow, the switch normally forwards the packet to the controller to trigger the new flow entry being programmed. The switch can also be used to forward all slow-path packets, e.g., Internet Control Message Protocol (ICMP) packets, to the controller for processing. It should be appreciated that the concept of a data packet flow can be defined broadly, e.g., a Transmission Control Protocol (TCP) connection, or all traffic from a particular Media Access Control (MAC) address or Internet Protocol (IP) address, or all packets with the same Virtual LAN (VLAN) tag, or all packets from the same switch port, or all traffic having one or more user-defined control flags, as well as including any combination of the foregoing conditionalities.

With respect to the example network implementation illustrated in FIG. 1A, reference numeral 115 refers to a network-wide controller for implementing the control plane operations of the network using a standardized interfacing architecture relative to the remaining network components, as exemplified by interfaces 116, 118. The network controller 115 may be operative to add and remove flow-entries from the flow tables, e.g., as part of defining the interconnection and routing among the set of data plane switches. The network controller 115 also handles network state distribution, such as collecting information from, and distributing routing instructions to, the switches. The network controller 115 can also be programmed to support any new addressing, routing, and complex packet processing applications. Accordingly, the network controller 115 may be deemed the "brain" of the example service provider network 100 wherein a switch may be required to connect to at least one controller functionality in order to operate properly.

Figure 1B:
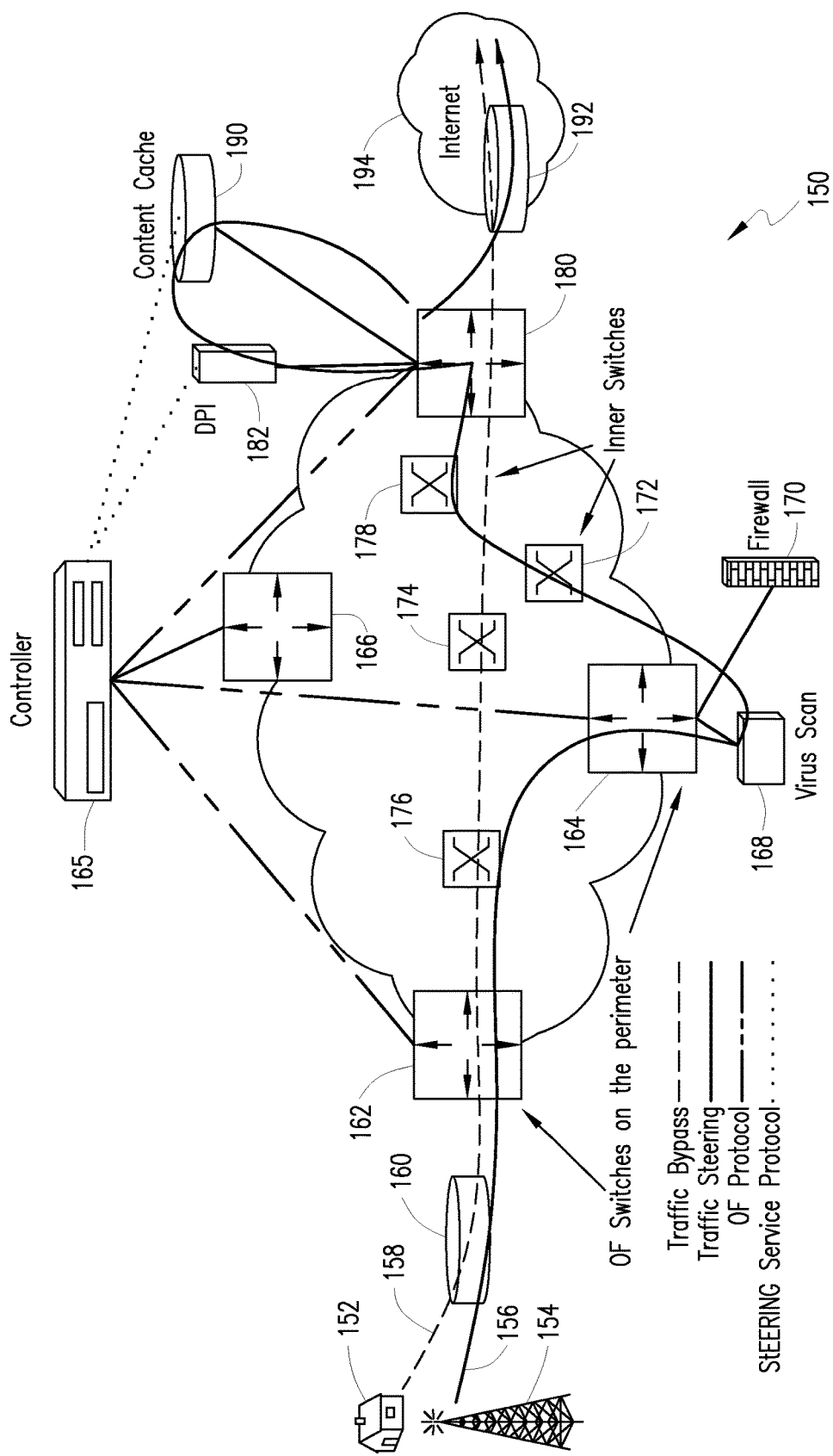
FIG. 1B depicts an additional example network wherein one or more embodiments of the present patent disclosure may be practiced.

It should be appreciated that the ingress and egress nodes of the example network 100 of FIG. 1A are placed at the perimeter of the network 100, wherein the ingress nodes 106-1 to 106-N may be configured to classify an incoming traffic flow and steer it towards the next service based on a services chaining policy and other service requirements (collectively illustrated as service requirements database 114) using a traffic steering mechanism executed by the controller node 115. Turning to FIG. 1B, shown therein is a somewhat simplified and/or more particularized rendition of a service provider network arrangement 150, wherein a services placement/assignment mechanism may be practiced according to an embodiment. As illustrated, services such as VS 168, Firewall 170, DPI 182, Content Cache 190 are provided to subscribers via the network using one or more perimeter nodes or switches 162, 164, 166, 180 and one or more inner nodes or switches 172, 174, 176, 178. In accordance with the description hereinabove, a logically centralized controller 165 provided according to the OpenFlow (OF) protocol is used to manage switches and middleboxes, e.g., services. In an example steering architecture, service paths may be configured based on the subscriber, particular application and the required service order, and may be provided as direction-specific or unidirectional. That is, different service paths may be specified for upstream and downstream traffic. In FIG. 1B, two different service paths are shown. Service path 156 for one subscriber (e.g., involving mobile network traffic from wireless infrastructure 154) shows upstream traffic through VS 168, DPI 182 and Content Cache 190 before exiting through perimeter switch 180 and entering Internet 194 via a border gateway 192. On the other hand, service path 158 for another (or the same) subscriber (e.g., involving fixed network traffic from subscriber home premises 152) bypasses all of the services.

As OpenFlow nodes provided on the perimeter of the network, switches 162, 164, 166, 180 may be configured to classify the incoming traffic and steer it under the control of controller 165 responsive to applicable services chaining policies pertaining to the respective flows 156, 158, wherein a service bypass policy may be provided in addition to policies requiring one or more services to be traversed. It should be appreciated that such service bypassing policies can be useful for saving resources in the network. Further, one skilled in the art will recognize that in the embodiment of FIG. 1B, perimeter switches 162, 164, 166, 180 are the network nodes to which services and/or other gateway nodes are connected. On the other hand, the inner switches 172, 174, 176, 178 may be configured to simply forward the traffic using Layer 2 (L2) switching and thus may only be connected to other switches. Accordingly, in one implementation, inner switches 172, 174, 176, 178 may or may not be OF switches controlled by controller 165. Regardless of whether the inner switches are OF-compliant switches, the steering mechanism executed by central controller 165 may involve a two-step process. The first step classifies incoming packets and assigns them a service path based on predefined subscriber, application, and ordering policies. The second step involves forwarding of packets to a next service based on its current position along its assigned service path. Such a two-step traffic steering process only needs to be performed once between any two border routers, regardless of the number of switches that connects them. Additional details regarding an example traffic steering implementation and placement of single-instance services in an SDN architecture may be found in one or more of the following commonly owned co-pending U.S. patent application(s): (i) "CHAINING OF INLINES SERVICES USING SOFTWARE DEFINED NETWORKING", application Ser. No. 13/556,456, filed Jul. 24, 2012, in the name(s) of Geoffrey Lefebvre, Erik Rubow and Ravi Manghirmalani; and (ii) "METHOD AND APPARATUS FOR PLACING SERVICES IN A NETWORK", application Ser. No. 13/751,826, filed Jan. 28, 2013, in the name(s) of Ying Zhang and Neda Beheshti-Zavareh; cross-referenced hereinabove and hereby incorporated by reference herein.

In one implementation of the example network architecture described above, one or more of the following aspects or factors may be considered according to an embodiment of a multi-instance services placement scheme of the present patent application. First, each subscriber may be required to specify the exact order or sequence of services that the subscriber's traffic flow needs to traverse (i.e., services requirements for a specific subscriber). For example, a subscriber may specify that the subscriber's traffic should first go through a Firewall service and then a DPI service. Second, a service provider/operator may deploy multiple instances of a service for various traffic management reasons, e.g., load balancing, bandwidth optimization, delay minimization, and the like. Illustratively, an inline services network may have three instances of Firewall service and two instances of DPI, which may be provided as virtualized service appliances in some implementations. Additionally, the flows of one subscriber can be assigned to different instances or replicas of services for load balancing. On the other hand, the setting of allocation of service instances can be dynamically changed from a default assignment. In one configuration, a default assignment strategy may be to route the traffic flow to the geographically closest service instances/replicas in order to minimize delay.

One skilled in the art will therefore recognize that the number of instances available for each service is an important factor or input, among others, in an embodiment of the services placement scheme according to the teachings set forth herein. Further, as will be described in detail below, a service that is estimated or otherwise determined to be the most stringent resource (e.g., having the smallest number of instances but a large number of service paths and/or large amount of data traffic traversing it) will be located or placed in the network first, with additional services iteratively placed thereafter.

For purposes of the present patent application, the multi-instance services placement mechanism may be formulated as an optimization mechanism wherein a suitable overall network metric is minimized, maximized or otherwise optimized relative to placement of services within a network. For example, an embodiment of the multi-instance services placement mechanism may implemented wherein the total delay or distance to be traversed for all subscribers' traffic (i.e., data flows) is minimized. Depending on how a network is configured, another embodiment of the multi-instance services placement mechanism may implemented wherein the total number of hops (i.e., hop count) to be taken by the subscriber data flows in the network is minimized. In a still further embodiment, other performance metrics such as overall network bandwidth consumption/allocation may be optimized for placing the multiple instances of services.

To formalize the various processes, steps, acts and blocks for implementing a services placement mechanism, an example service provider network may be abstracted using certain constructs from graph theory, wherein a predetermined objective function, e.g., a network traffic/performance metric, is minimized or otherwise optimized. For this purpose, the following notation is used. An example network, e.g., an OF network having the traffic steering mechanism described hereinabove, is denoted as a graph $G=(V, E)$ where node set V represents the switches in the network and edge set E represents the pair-wise links or edges among the switches depending upon the given connectivity or configuration of the network. In one implementation, graph G may be an undirected symmetric graph with weighted edges, i.e., if $(u, v) \ 0 \ E$, then $(v, u) \ 0 \ E$. Each edge may be associated with a delay value $d_{u,v}$. The delay value can simply be $d_{u,v}=d_{v,u}=1$, meaning that the delay may be approximated as the hop count.

The set of inline services is denoted as $S=\{s_1, s_2, \ldots s_h\}$, where each element is one type of service to be placed. Each subscriber's data flow has its own requirement on the sequence of inline services to traverse. For example, subscriber i's requirement $r_i$=ing0, $s_1$, $s_3$, $s_5$, $s_2$, egr0, wherein ing0 and egr0 are the ingress and egress locations of the particular subscriber's traffic. The set of requirements is $R=\{r_1, r_2, \ldots r_k\}$, where there are k subscribers in total. Additionally, there is another $\{1 \times h\}$ vector or replica array that stores the number of replicas or instances for each service, $N=\{n_1, n_2, \ldots n_h\}$, indicating that a particular service $s_i$ has $n_i$ number of instances.

For purposes of services placement, the objective is to open a subset M ($|M|=|S|=h$) of the locations among all candidates $VN=|V|$, and place the services so that the total delay for all of the users is minimized. Given a service placement L, for each service sequence $r_i$, the total delay for traversing all of the services in $r_i$ can be computed. This computation is denoted as:

$$d(r_i)^L = \sum_{(a,b)} \sum_{(u,v) \in path_{a,b}^L} d_{u,v}.$$

Here $d(r_i)^L$ means the delay of service chaining $r_i$ under the solution L. Elements a and b can be any ingress points, egress points, and any service instances. It is a summation over the delay between all the consecutive ingress/egress nodes and services (a, b) in $r_i$. The delay for each consecutive service pair $(s_a, s_b)$ is computed as the sum of all the edges (u, v) in the path between a and b under the solution:

$$L(path_{a,b}{}^L)$$

This solution can be formulated as find L to:

$$\text{minimize} \sum_{i=1}^{k} d(r_i)^L.$$

In accordance with the teachings of the present patent disclosure, a virtual graph is created by examining the dependencies between each individual service and other services as well as all the ingress and egress nodes. Thereafter, the services may be placed iteratively, using a local optimization heuristic each time (e.g., a greedy algorithm) for selecting a location that contributes to the smallest total performance penalty (in this case, delay) with respect to all the placed services. It should be recognized that objective functions for local optimization heuristics may also involve other network metrics, taken alone or in any combination with the delay metric in order to effectuate service placement.

For purposes of the present patent application, service dependency may be determined as a quantification of how the location of a current service under consideration depends or should depend on the location of other entities. A service dependency graph $G_0=(V_0, E_0)$ may be defined wherein $V_0$ contains all services in S, plus all the edge nodes (i.e., ingress and egress nodes) in G. An edge $(u_0, v_0)$ in $E_0$ means that there is traffic from $u_0$ to $v_0$. Furthermore, a weight factor or parameter may be defined or otherwise assigned to the edge, $w(u_0, v_0)$, indicating the total number of subscribers or data flows whose traffic needs to go from $u_0$ to $v_0$ (i.e., edge weight). It should be recognized that graph $G_0$ can be a directed graph, since there is directionality associated with the data traffic flows. Yet another weight factor or parameter may be defined or otherwise associated with each node in graph $G_0$, i.e., $w(v_0)$, that may be determined or computed as the sum of weights of the node's outbound edges to unplaced services (i.e., node weight).

Accordingly, it should be appreciated that the services placement mechanism may be treated as a conversion mechanism or a graph embedding mechanism for mapping from the virtual service graph $G_0$ to the physical network graph G. As set forth above, a greedy algorithm based on successive local optimizations may be used for effectuating such a mechanism for the sake of computational efficiency in a large graph, with the expectation of finding a global optimum. One skilled in the art will recognize, however, that other formal optimization techniques such as linear programming or dynamic programming, etc. may also be used although such techniques can be extremely computation-intensive and may take an inordinate amount of time for convergence, especially where networks with several hundred nodes and a huge number of subscriber flows are involved.

In one embodiment, the services placement mechanism may consider all ingress and egress nodes in the virtual service graph $G_0$ as the nodes that are already placed. A new weight for each service may be calculated as a function based on a ranking of the service dependencies and a ranking of the number of service instances. Initially, all services are treated as members of an UnPlaced set because they are yet to be placed or assigned relative to the nodes in the network. In each iteration, an unplaced service with the largest new weight is selected and all the replicas of that service are placed one by one. Each time, among all locations in graph G, a particular location solution is selected having the smallest total delay between the placed services and the specific instance of the particular service being considered for placement. After it is placed, the service replica array is updated with the remaining load on each replica. After all the instances/replicas of the particular service are placed, the nodal weights of all other unplaced services are updated until the UnPlaced set is decremented to zero (i.e., no more services to be placed).

An implementation of the foregoing embodiment of a services placement mechanism may be exemplified and/or effectuated by way of a set of computer-readable instructions executable by an OF-compliant central controller such as, e.g., controller 165 described above, or some other management node provided in accordance with a suitable network architecture. An example process flow pertaining to such an embodiment is provided in Table 1 below.

TABLE 1

```
procedure Service_Placement(G,S,R,N)
    UnPlaced=S;
    G₀ = S χ ingress(G) χ egress(G);
    for each subscriber's request r_k 0 R do
        for each consecutive service pair (a, b) in r_k do
            create an edge between a and b in G₀
            w(a, b) + +
            weight(a) + +
        end for
    end for
    for every service i do
        new Weight[i] = [rank(weight(i))+rank(replicaNum(i))]/2
    end for
    while UnPlaced ≠ do
        select v' with largest new Weight;
        I N_v' = Ø
        for each location v in G do
            if traffic from v to v' then
                IN_v' = I N_v' χ v
            end if
        end for
        while n_v' > 0 do
            for each location v in G do
                if capacity(v) > 0 then
                    compute delay D for placement
                    v'= v'';
                end if
            end for
            select v'' in G so that D is minimized
            update I N_v'
            n_v' − −
        end while
        UnPlaced = UnPlaced − {s_curr}
        for every node u' in G₀ do
            weight(u') = weight(u') −w(v', u')
        end for
    end while
```

One skilled in the art will recognize upon reference hereto that the foregoing services placement process flow utilizes four multivariate/multi-dimensional components, namely, G, S, R, and N, as inputs according to one embodiment, which may be implemented in a number of ways, including but not limited to using dedicated hardware components, software/firmware engines based on programming instructions in any known or heretofore unknown programming languages, and the like. As described above, a service dependency graph, $G_0$, is created as union of S and ingress/egress nodes of the physical graph G. Also, as part of initialization, all the services including their instances, if any, are placed in an UnPlaced set. Upon creating directional edges for each consecutive service pairs, appropriate weight parameters are computed based on how many flows traverse a particular edge and how many flows traverse a particular service. The foregoing operations may be collectively referred to as an initialization and weight computation block or loop. Thereafter, for each service, a new weight may be computed as a function of the previously computed weight parameters. In the exemplary process flow shown above, a new weight is calculated as a mean or average of rankings of the two weights (i.e., edge weight and node weight). These operations may be referred to as a new weight computation block or loop. A third set of operations, collectively referred to as a placement operations block or loop, pertain to the UnPlaced set for performing iterative local optimization processes at each stage, starting with selecting a service having the largest new weight value.

In one embodiment, the output of the foregoing services placement process flow may be realized as a set of mapping assignments between the graph G (representing the physical nodes of a service network) and middleboxes S (representing the multi-instance services to be placed). Responsive to the mapping relationships, the service network's controller/management logic may be configured to place, deploy, connect to and/or otherwise assign the services relative to the network nodes. Furthermore, the mapping relationship output may also be provided to other administration/management nodes associated with the service network. It should be appreciated that it is possible to have multiple service instances and multiple types of services placed or assigned relative to the same network node. For example, at least one instance of a DPI service and at least one instance of a NAT service may both be placed at the same network node. Additionally, services may be assigned to ingress/egress nodes and/or interior nodes in some implementations based on the service network configuration, services chaining requirements, number of instances each service may have, etc.

Figure 2:
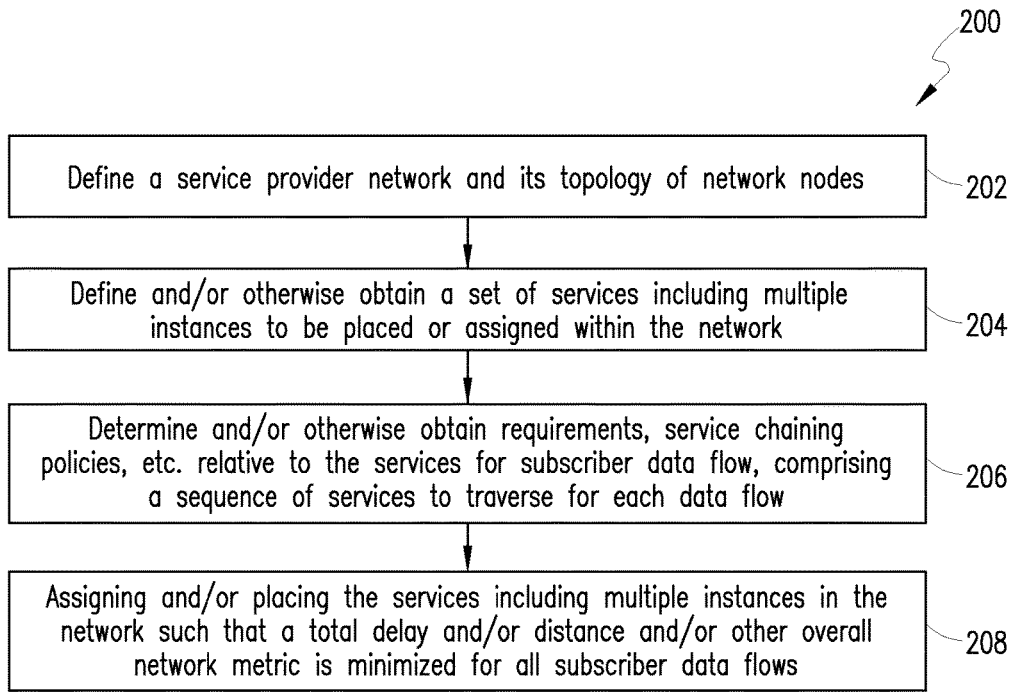
FIGS. 2 and 3 depict flowcharts pertaining to varying steps, acts and/or blocks according to one or more embodiments of a services placement and/or assignment mechanism of the present patent disclosure.
Figure 3:
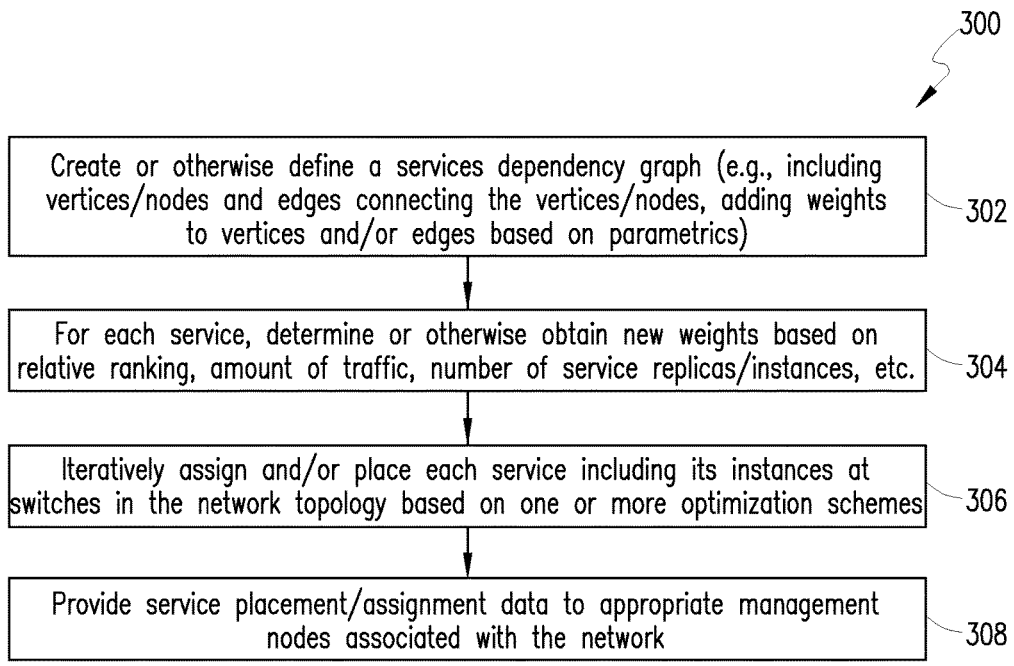

Referring to FIGS. 2 and 3, shown therein are flowcharts pertaining to steps, acts and/or blocks according to an embodiment of a services placement and/or assignment mechanism generally shown at reference numerals 200, 300. At block 202 illustrated in FIG. 2, a service provider network and its topological arrangement of the network nodes therein are defined or otherwise obtained. In one implementation, the service provider network may be architected as an SDN, e.g., as shown in FIGS. 1A and 1B. In another implementation, the service provider network may include an architecture where there may be varying levels of data plane and control plane separation/coupling within the network nodes. At block 204, one or more services including respective multiple instances, if any, are defined, determined, initialized and/or otherwise obtained. One or more service requirements, service chaining policies, operator/application policies, etc. relative to various subscriber data flows are determined, defined and/or otherwise obtained, as set forth at block 206. As described previously, each subscriber data flow may therefore be associated with a set of services (e.g., an ordered sequence) to be traversed between an ingress node and an egress node of the service provider network. Furthermore, where a subscriber data flow is not required to traverse any services (i.e., a "no services" policy), a relaxed set of requirements may be implemented. It should be appreciated that services, chaining policies, etc. may be retrieved from an operator management node such as an Authentication, Authorization and Accounting (AAA) node. At block 208, the services and their multiple instances, if any, are placed and/or assigned in the network relative to one or more network nodes such that an overall network metric is minimized, maximized or otherwise optimized for all subscriber flows.

Turning to FIG. 3, shown therein is a flowchart of additional steps, functions, acts and/or blocks pertaining to the functions set forth at block 208. At block 302, a services dependency graph is created or otherwise defined, which includes defining nodes or vertices based on services and network ingress/egress nodes of the service provider network. Additionally, node weights and edge weights may be defined, respectively, for the nodes and edges of the service dependency graph based on parametrics relating to the number of flows, degree of demand of services per flow, etc. For each service, a new weight based on relative ranking, amount of traffic, number of service replicas/instances, etc. may be determined or otherwise obtained (block 304). It should be realized that in certain example implementations it is not necessary to include both node weights and edge weights. Likewise, in certain other implementations, additional parametric weights may be defined or provided for purposes of effectuating a services placement mechanism according to the teachings herein. At block 306, a greedy algorithm (e.g., an algorithm that follows the problem solving heuristic of making locally optimal choices at each successive stage of iteration) may be employed for assigning services to the network nodes. Although a globally optimal placement solution may not necessarily be found upon completion of the process flow each time, the heuristic placement mechanism may approximate a "good enough" solution within a reasonable time and the limited computational resources. To implement such a mechanism, the following components may be provided at least in some combination. First, a candidate set is defined, from which a placement solution may be created. A selection function is provided or otherwise defined, which chooses the best candidate to be added to the placement solution. A feasibility function may be defined that may be used to determine if a candidate can contribute to a placement solution. A solution function may be provided for indicating whether a complete placement solution has been achieved. It should be realized that a greedy algorithmic placement mechanism of the present disclosure may be implemented using different characteristics of "greediness", for example, using "pure greediness", "orthogonal greediness", or "relaxed greediness", as well as different metrics to guide the greediness steps. Further, in certain network implementations, e.g., where a relatively small number of network nodes and/or subscriber flows are involved, a more formal optimization technique may be used for services placement, as pointed out previously. Upon obtaining and/or otherwise determining a placement solution, the middlebox services and respective instances may be assigned to the network nodes and such assignment data may be provided to one or more management nodes associated with the network (block 308).

Figure 4:
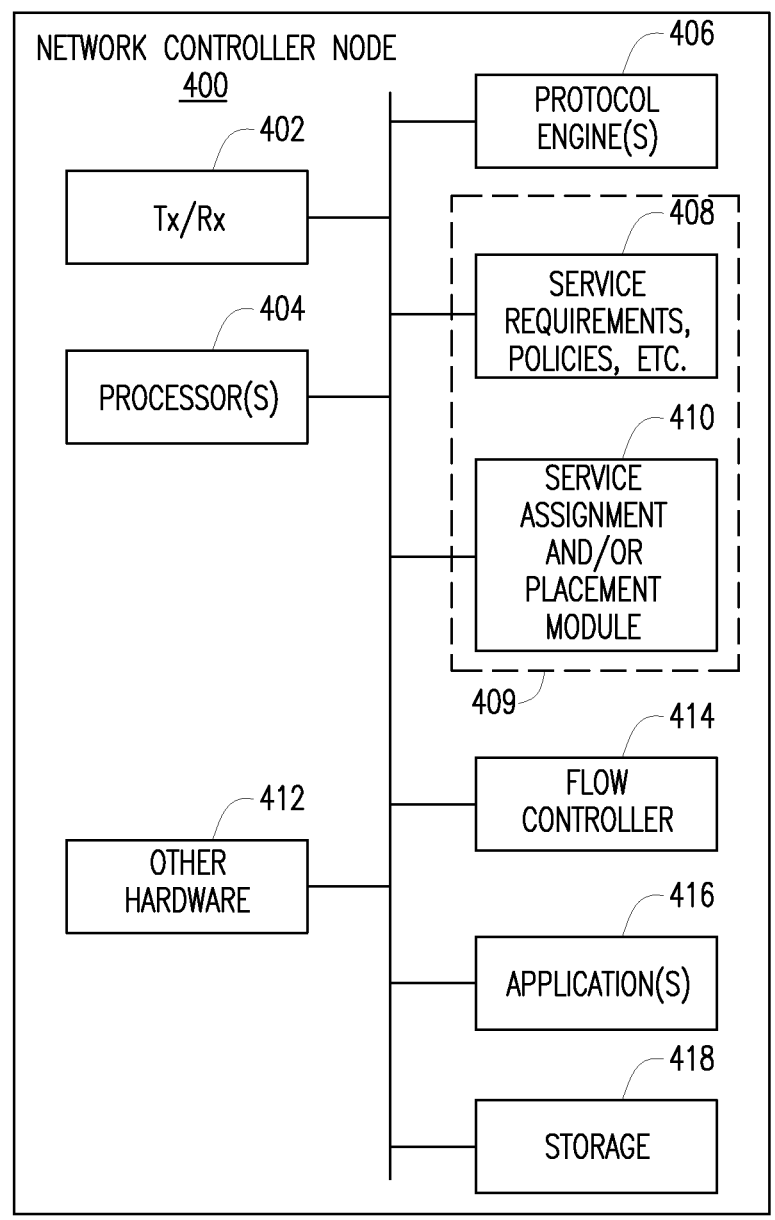
FIG. 4 depicts a block diagram of a network controller node that may be configured to implement a services placement and/or assignment mechanism according to an embodiment of the present patent disclosure.

FIG. 4 depicts a block diagram of a network controller node 400 implemented as an exemplary computer system that may be configured to effectuate a services placement and/or assignment mechanism according to an embodiment of the present patent disclosure. Those skilled in the art will recognize that the network controller node 400 is illustrative of controller 115 or 165 described hereinabove. One or more processors 404 are operative to control a plurality of subsystems (implemented in hardware, software, firmware and/or in any combination thereof) that may be interconnected using suitable bus architecture. One or more Tx/Rx interface modules 402 are operative to effectuate various types of network connectivity with respect to the controller node 400, including but not limited to connectivity internal to a service provider network as well as external connectivity. One or more protocol engines 406 are operative to effectuate appropriate communications protocols based on how a service provider network may be architected. Volatile storage 418 may comprise various types of random access memory (RAM) for providing temporary storage of data or information. Nonvolatile storage 409 is illustrative of persistent storage, e.g., read-only memory (ROM) circuits, erasable programmable read-only memory (EPROM) circuits, Flash memory circuits, as well as external memory cards, and the like, wherein appropriate subscriber information and related service chaining policies data 408 may be stored, downloaded, uploaded, updated, and/or reconfigured by operators, third-party vendors, and/or subscribers via wireless means (over-the-air, for example) or over the Internet. In addition, persistent memory 409 may be configured to include program instructions consolidated as one or more modules 410 executable by one or more processors 404 for effectuating placement and/or assignment of multi-instance services in a service provider network. A flow controller 414 may be provided with respect to effectuating control of OF-compliant flow tables in OF-compliant forwarding elements in an SDN-based service provider network. One or more applications 416 may also be provided as part of the network controller node 400 for effectuating network-level functionalities specific to a service provider. Other hardware 412 may include one or more user input/output devices (e.g., display screens, pointing devices, etc.), command interfaces, bus controllers, memory controllers, power supply circuitry, and the like.

It should be appreciated that the foregoing service placement/assignment methodology may be equally applied, mutatis mutandis, in a service provider network having an architecture that exhibits varying degrees of coupling between the control and data forwarding planes depending on specific implementation as pointed out previously. In one embodiment, a generalized network architecture of a service provider network 500 is exemplified in FIG. 5. One skilled in the art will recognize that example service provider network 500 depicted in FIG. 5 may include a plurality of interior network nodes 506-1 to 506-N, each having both data forwarding and control plane functionalities, in addition to one or more ingress nodes 504A and one or more egress nodes 504B. Similar to the network arrangement described in FIG. 1A, one or more subscriber data flows 502A enter the service provider network 500 at the ingress nodes 504A and traverse the various nodes prior to exiting from the egress nodes 504B as exit flows 502B. Because the data forwarding plane and control plane functionalities are coupled in the architecture of FIG. 5, each network node may comprise a local configuration/management layer (e.g., layers 516-1 to 516-N), a control layer (e.g., layers 516-1 to 518-N), and a data forwarding layer (e.g., 520-1 to 520-N), in addition to appropriate north-bound interface (NBI) functionality (e.g., NBI 514-1 to 514-N) in reference to suitable network management node(s). In some instances, certain local services may also be provided as part of a particular network node in a tightly coupled configuration. Aside from such local services, a plurality of services 510 may also be configured for provisioning pursuant to service requirement rules, chaining policies, etc., executed under a service assignment methodology as described previously. By way of illustration, a suitable central management node 508 may be configured to execute service assignment/placement with respect to the peripheral and/or interior nodes of the service provider network, wherein one or more services may be hosted on respective dedicated hardware machines and/or may be implemented as virtual service appliances. Further, one or more services may also be provided as multiple instances. A suitable connection fabric 512 may be provided for effectuating appropriate connectivity (e.g., inter-nodal connectivity, north-bound and south-bound interfacing, inter-service connections, etc.) within the service provider network 500.

Figure 6:
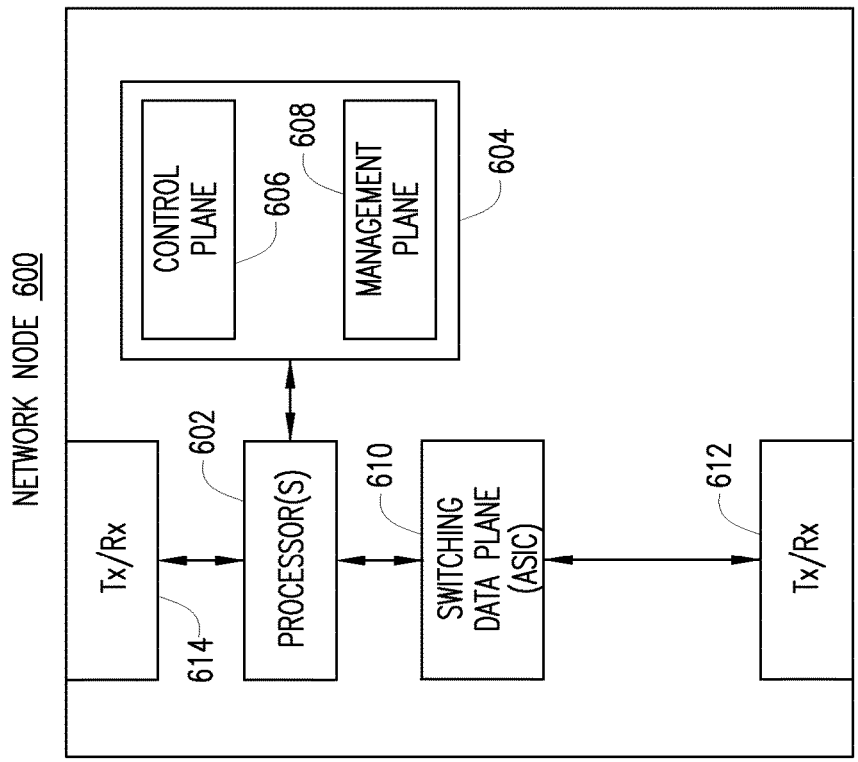
FIG. 6 depicts a block diagram of an example network node having both data forwarding and control plane functionalities.

FIG. 6 depicts a block diagram of an example network node 600, e.g., an interior network node, having both data forwarding and control plane functionalities. One or more processors 602 may be provided for the overall control and management of the network node 600. Suitable memory, including persistent non-volatile storage 604, may be coupled to the processors 602 via appropriate bus structures. Typically, control plane functionality 606 and local management functionality 608 may be provided as executable code portions or program instructions stored in non-volatile memory 604, to be executed by processors 602 as and when needed. A data forwarding plane may be implemented as an Application-Specific Integrated Circuit (ASIC)-based hardware module 610 that is coupled to appropriate transceiver circuitry 612 having a plurality of ports. In general, the data forwarding plane is responsible for carrying data packets from one port to another by following rules that may be programmed into the hardware, wherein the control plane contains the logic that the node uses to program the data plane. The management plane 608 allows a network administrator to access the device so that suitable configuration, test, debug, etc. operations may be performed (e.g., using a network management tool). Additional Tx/Rx circuitry 614 may be provided as part of the network node 600 to facilitate, e.g., appropriate NBI functionality.

Figure 5:
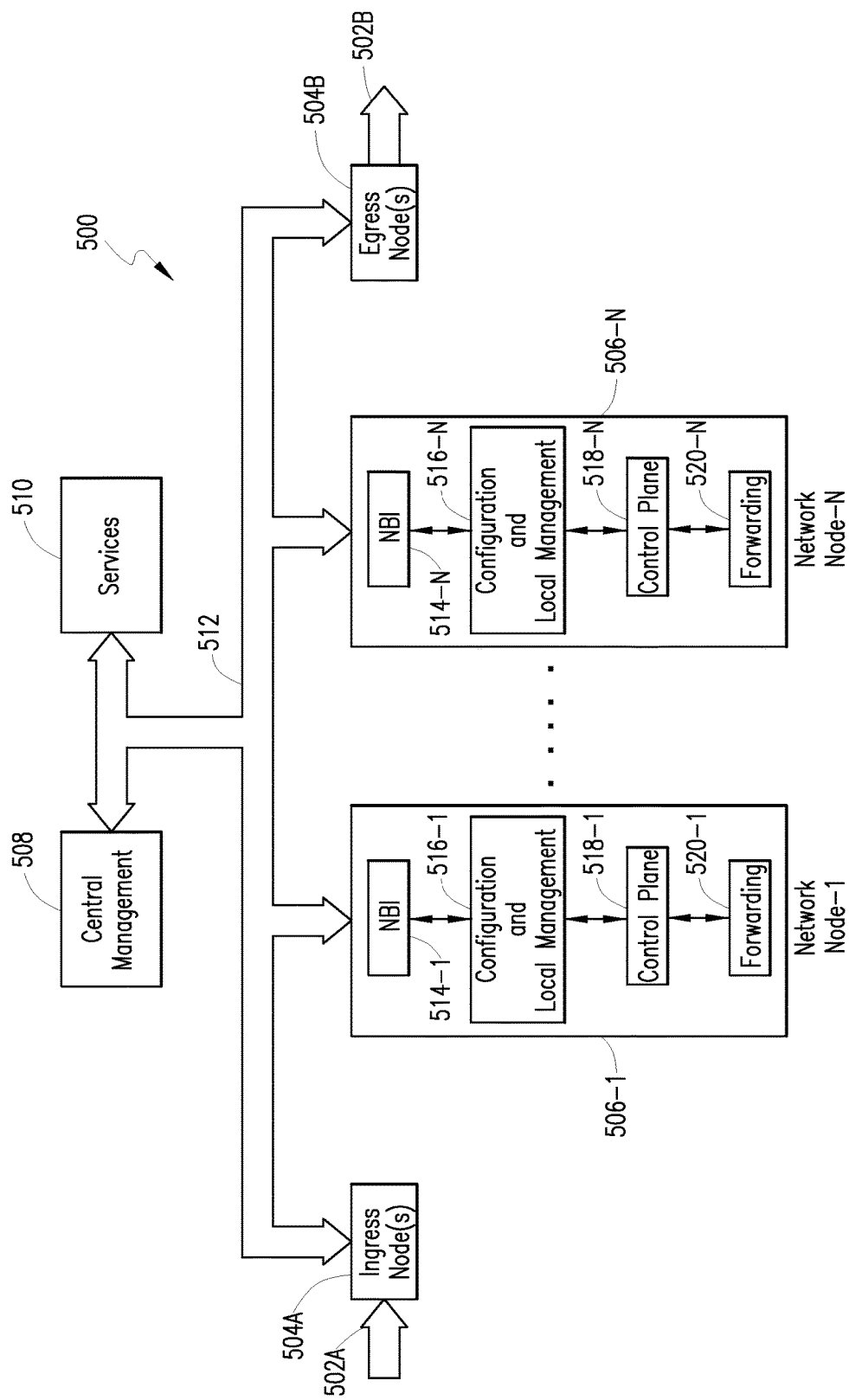
FIG. 5 depicts another example service provider network having nodes with data forwarding and control plane functionalities wherein an embodiment of the present patent disclosure may be practiced.
Figure 7:
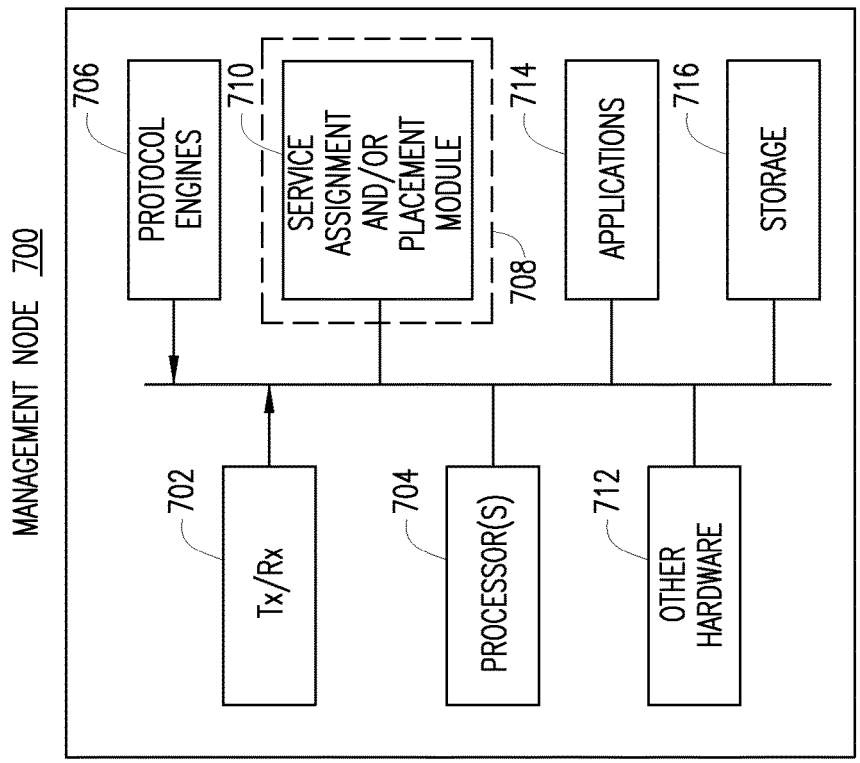
FIG. 7 depicts a block diagram of a network management node that may be configured to implement a services placement and/or assignment mechanism in the service provider network of FIG. 5 according to a further embodiment of the present patent disclosure

FIG. 7 depicts a block diagram of a network management node or server 700 that may be configured as a computer system adapted to implement a services placement/assignment mechanism (e.g., as part of central management 508) in the service provider network of FIG. 5 according to a further embodiment of the present patent disclosure. It will be recognized that the management node 700 is somewhat similar in certain aspects to the network controller node 400 described hereinabove. Analogous to the controller node 400, one or more processors 704 are operative to control a plurality of subsystems (implemented in hardware, software, firmware and/or in any combination thereof) that may be interconnected using suitable bus architecture. One or more Tx/Rx interface modules 702 are operative to effectuate various types of network connectivity with respect to the management node 700 as described above, e.g., associated with a service provider network 500. One or more protocol engines 706 are operative to effectuate appropriate communications protocols based on how a service provider network may be architected. Volatile storage 716 may comprise various types of random access memory (RAM) for providing temporary storage of data or information. Nonvolatile storage 708 is illustrative of non-transitory persistent storage, e.g., ROM, EPROM, Flash memory, etc., as well as external memory cards, and the like, wherein suitable program instructions consolidated as one or more modules 710 are executable by one or more processors 704 for effectuating placement and/or assignment of multi-instance services in a service provider network according to the methodology set forth above. Appropriate subscriber information and related service chaining policies data may be either locally stored (not specifically shown) or otherwise downloaded, uploaded, updated, and/or reconfigured by operators, third-party vendors, and/or subscribers via wireless means (over-the-air, for example) or over the Internet. Other hardware 712 and one or more applications 714 and may also be provided as part of the network management node 700 for effectuating network-level functionalities specific to a service provider as described previously.

Based upon the foregoing Detailed Description, it should be appreciated that embodiments of the present disclosure provide a novel and nonobvious methodology for placing or otherwise assigning multi-instance services within a service provider network. As service deployment in virtualized environments and/or cloud-based platforms becomes more prevalent, the flexibility of moving service instances to more optimal or otherwise more suitable locations within the network assumes particular significance. Because default assignments can be changed dynamically, service network operators can bring more services online without impacting scalability. One or more embodiments set forth herein may be practiced in any type of service network architecture in conjunction with various traffic steering mechanisms in order to minimize, maximize or otherwise optimize a host of network performance metrics such as, e.g., overall delay, distance, hop count, and/or bandwidth consumption or allocation (e.g., by reducing inefficient bandwidth usage). By selectively steering the traffic through or away (i.e., bypassing) from specific services, capital expenditure savings can be advantageously realized. Further, by employing an iterative local optimization scheme in accordance with the teachings of the present disclosure, convergent solutions may be reliably obtained even in highly complex network environments with a large number of nodes, subscriber data flows, or both.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium may include the following: portable computer diskettes, RAM circuits, ROM circuits, EPROM or Flash memory circuits, portable compact disc read-only memory (CD-ROM) discs, and portable digital video disc read-only memory (DVD/Blu-ray) discs. The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and blocks from different flowcharts may be combined, rearranged, and/or reconfigured into additional flowcharts in any combination or subcombination. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, module, element, step, act, or function is essential such that it must be included in the scope of the claims. Reference to an element in the singular is not intended to mean "one and only one" unless explicitly so stated, but rather "one or more" or "at least one". All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A network management node configured to operate with a service provider network, the network management node comprising:
   one or more processors; and
   a persistent memory coupled to the one or more processors, wherein the persistent memory includes instructions executable by one or more processors and configured to:
      define a topology of the service provider network having a plurality of network nodes, each network node including a data forwarding plane module and a control plane module in a coupled configuration for providing integrated data plane and control plane functionality;
      define a set of inline services to be placed within the service provider network, wherein at least one inline service is provided in multiple instances as service replicas;
      obtain a set of service chaining requirements for a plurality of subscriber data flows entering the service provider network at one or more ingress nodes, wherein each service chaining requirement is defined as a particular ordered sequence of inline services to be traversed for each subscriber data flow before exiting from one or more egress nodes; and
      assign the inline services including the at least one inline service having multiple instances to one or more network nodes of the service provider network such that a network metric associated with the service provider network is optimized for all subscriber data flows.

2. The network management node as recited in claim 1, wherein the network metric to be optimized comprises at least one of a bandwidth metric, a total delay, a total distance and a total number of hops for all subscriber data flows.

3. The network management node as recited in claim 2, wherein the instructions to assign the inline services further comprise:
   instructions for defining service dependencies for each inline service and ranking the service dependencies;
   instructions for determining a weight for each inline service based on at least one of the ranking of the service dependencies and number of instances of the inline service to be placed; and
   instructions for iteratively placing each inline service including its instances relative to one or more network nodes of the service provider network based on optimizing the network metric, the iterative assignment starting with the inline service having a largest weight value among all weights of the services.

4. The network management node as recited in claim 3, wherein the network metric is optimized based on a local optimization mechanism determined at each iterative assignment of the inline services.

5. The network management node as recited in claim 1, wherein one or more of the inline services are hosted on respective dedicated hardware machines supported by corresponding network nodes.

6. The network management node as recited in claim 1, wherein one or more of the inline services are implemented as virtual service appliances supported by corresponding network nodes.

7. The network management node as recited in claim 1, wherein the inline services comprise one or more instances of Deep Packet Inspection (DPI), Virus Scanning (VS), Intrusion Detection and Prevention (IDP), Firewall (FW) filtering, and Network Address Translation (NAT).

8. The network management node as recited in claim 1, wherein at least one service chaining requirement comprises a chaining policy involving placement of one or more instances of a particular inline service at an ingress node of the service provider network.

9. The network management node as recited in claim 1, wherein at least one service chaining requirement comprises a chaining policy involving placement of one or more instances of a particular inline service at an egress node of the service provider network.

10. A method for assigning inline services in a service provider network, the method comprising:
    defining a topology of the service provider network having a plurality of network nodes, each network node including a data forwarding plane module and a control plane module in a coupled configuration for providing integrated data plane and control plane functionality;
    defining a set of inline services to be placed within the service provider network, wherein at least one inline service is provided in multiple instances as service replicas;
    obtaining a set of service chaining requirements for a plurality of subscriber data flows entering the service provider network at one or more ingress nodes, wherein each service chaining requirement is defined as a particular ordered sequence of inline services to be traversed for each subscriber data flow before exiting from one or more egress nodes; and
    assigning the inline services including the at least one inline service having multiple instances to one or more network nodes of the service provider network such that a network metric associated with the service provider network is optimized for all subscriber data flows.

11. The method as recited in claim 10, wherein the network metric to be optimized comprises at least one of a bandwidth metric, a total delay, a total distance and a total number of hops for all subscriber data flows.

12. The method as recited in claim 10, wherein assigning the inline services further comprises:
    defining service dependencies for each inline service and ranking the service dependencies;
    determining a weight for each inline service based on at least one of the ranking of the service dependencies and number of instances of the inline service to be placed; and
    iteratively placing each inline service including its instances relative to one or more network nodes of the service provider network based on optimizing the network metric, the iterative assignment starting with the inline service having a largest weight value among all weights of the inline services.

13. The method as recited in claim 12, wherein the network metric is optimized based on a local optimization mechanism determined at each iterative assignment of the inline services.

14. The method as recited in claim 10, wherein one or more of the inline services are hosted on respective dedicated hardware machines supported by corresponding network nodes.

15. The method as recited in claim 10, wherein one or more of the inline services are implemented as virtual service appliances supported by corresponding network nodes.

16. The method as recited in claim 10, wherein the inline services comprise one or more instances of Deep Packet Inspection (DPI), Virus Scanning (VS), Intrusion Detection and Prevention (IDP), Firewall (FW) filtering, and Network Address Translation (NAT).

17. The method as recited in claim 10, wherein at least one service chaining requirement comprises a chaining policy involving placement of one or more instances of a particular inline service at an ingress node of the service provider network.

18. The method as recited in claim 10, wherein at least one service chaining requirement comprises a chaining policy involving placement of one or more instances of a particular inline service at an egress node of the service provider network.

19. A non-transitory computer-readable medium containing instructions stored thereon which, when executed by a computer system configured to operate as an network management node associated with a service provider network, perform the acts:

defining a topology of the service provider network having a plurality of network nodes, each network node including a data forwarding plane module and a control plane module in a coupled configuration for providing integrated data plane and control plane functionality;

defining a set of inline services to be placed within the service provider network, wherein at least one inline service is provided in multiple instances as service replicas;

obtaining a set of service chaining requirements for a plurality of subscriber data flows entering the service provider network at one or more ingress nodes, wherein each service chaining requirement is defined as a particular ordered sequence of inline services to be traversed for each subscriber data flow before exiting from one or more egress nodes; and assigning the inline services including the at least one inline service having multiple instances to one or more network nodes of the service provider network such that a network metric associated with the service provider network is optimized for all subscriber data flows.

20. The non-transitory computer-readable medium as recited in claim 19, wherein the instructions for assigning the inline services further comprise:

instructions for defining service dependencies for each inline service and ranking the service dependencies;

instructions for determining a weight for each inline service based on at least one of the ranking of the service dependencies and number of instances of the inline service to be placed; and instructions for iteratively placing each inline service including its instances relative to one or more network nodes of the service provider network based on optimizing the network metric, the iterative assignment starting with the inline service having a largest weight value among all weights of the services.

* * * * *